(12) United States Patent
Jani et al.

(10) Patent No.: US 11,575,677 B2
(45) Date of Patent: Feb. 7, 2023

(54) ENTERPRISE ACCESS CONTROL GOVERNANCE IN A COMPUTERIZED INFORMATION TECHNOLOGY (IT) ARCHITECTURE

(71) Applicant: FMR LLC, Boston, MA (US)

(72) Inventors: Apurva Jani, Cary, NC (US); John Alderson, North Salt Lake, UT (US); Rajath Madihally Narayana, Raleigh, NC (US)

(73) Assignee: FMR LLC, Boston, MA (US)

( * ) Notice: Subject to any disclaimer, the term of this patent is extended or adjusted under 35 U.S.C. 154(b) by 468 days.

(21) Appl. No.: 16/799,725

(22) Filed: Feb. 24, 2020

(65) Prior Publication Data

US 2021/0266323 A1   Aug. 26, 2021

(51) Int. Cl.
  *H04L 9/40* (2022.01)
  *G06Q 10/06* (2012.01)
  *G06N 20/00* (2019.01)

(52) U.S. Cl.
  CPC .......... *H04L 63/102* (2013.01); *G06N 20/00* (2019.01); *G06Q 10/063112* (2013.01); *H04L 63/20* (2013.01)

(58) Field of Classification Search
  CPC ..... H04L 63/102; H04L 63/20; H04L 63/104; G06N 20/00; G06Q 10/063112
  See application file for complete search history.

(56) References Cited

U.S. PATENT DOCUMENTS

| | | | |
|---|---|---|---|
| 5,388,196 A | 2/1995 | Pajak et al. | |
| 6,922,699 B2 | 7/2005 | Schuetze et al. | |
| 7,207,041 B2 * | 4/2007 | Elson | H04L 9/40 718/1 |
| 7,552,470 B2 * | 6/2009 | Dominic | H04L 63/105 726/8 |
| 8,140,476 B2 | 3/2012 | Aharoni et al. | |
| 8,225,416 B2 * | 7/2012 | Richards | G06Q 10/10 726/27 |
| 8,972,312 B2 | 3/2015 | Rachevsky et al. | |

(Continued)

*Primary Examiner* — Javier O Guzman
(74) *Attorney, Agent, or Firm* — Cesari & McKenna, LLP (57) ABSTRACT

Methods and apparatuses are described for enterprise access control governance in a computerized information technology (IT) architecture. A server determines access control entitlements for each of a plurality of users of the IT architecture, and converts the access control entitlements for each user into a multidimensional vector. The server generates a vector space comprising a plurality of nodes, each node in the vector space corresponding to a multidimensional vector associated with the access control entitlements. The server determines clusters of nodes in the vector space by using a similarity measure based upon dimensions of the vector. The server identifies a job role associated with each of the clusters of nodes in the vector space based upon access control entitlements that are common to the nodes. The server locates outlier nodes in the vector space positioned at least a predetermined distance away from at least one of the clusters. The server determines differences between the entitlements for each of the outlier nodes and the entitlements for a node in the nearest one or more clusters and adjusts the existing entitlements for the each user associated with the outlier nodes based upon the determined difference.

24 Claims, 8 Drawing Sheets

(56) References Cited

U.S. PATENT DOCUMENTS

| | | | |
|---|---|---|---|
| 9,037,711 B2* | 5/2015 | Maida-Smith | G06F 21/6209 |
| | | | 709/204 |
| 9,147,055 B2 | 9/2015 | Baikalov et al. | |
| 9,456,012 B2 | 9/2016 | Cohen | |
| 9,563,720 B2 | 2/2017 | Carbonell et al. | |
| 9,977,810 B2 | 5/2018 | Goel et al. | |
| 10,089,480 B1* | 10/2018 | Wang | H04L 63/104 |
| 10,609,041 B1* | 3/2020 | Wilczynski | G06F 21/62 |
| 2002/0078004 A1* | 6/2002 | Ambrosini | H04L 63/105 |
| 2005/0192925 A1* | 9/2005 | Nichols | G06Q 10/00 |
| 2008/0052102 A1 | 2/2008 | Taneja et al. | |
| 2011/0145291 A1 | 6/2011 | Aharoni et al. | |
| 2012/0047575 A1 | 2/2012 | Baikalov et al. | |
| 2013/0246470 A1 | 9/2013 | Price et al. | |
| 2014/0053126 A1* | 2/2014 | Watson | G06F 8/70 |
| | | | 717/102 |
| 2016/0352778 A1* | 12/2016 | Chari | G06N 20/00 |
| 2017/0351858 A1* | 12/2017 | Knapp | G06F 11/3433 |
| 2017/0352245 A1* | 12/2017 | Maher | G08B 21/182 |
| 2018/0375886 A1* | 12/2018 | Kirti | H04L 67/10 |
| 2019/0042988 A1* | 2/2019 | Brown | G06N 5/022 |
| 2019/0207946 A1 | 7/2019 | Mertens et al. | |
| 2020/0074327 A1* | 3/2020 | Yamamoto | G06Q 10/06 |
| 2020/0403858 A1* | 12/2020 | Nassar | G06F 16/903 |
| 2021/0064772 A1* | 3/2021 | Southerland | G06F 21/6218 |
| 2021/0125089 A1* | 4/2021 | Nickl | G06F 21/554 |

* cited by examiner

| user_id | entitlement_count | unique entitlements | |
|---|---|---|---|
| a015978 | 60 | 60 | APP_IMAGE_CAPTURE^WEBSCANNER_VIEW<br>EI_PLATFORM_MOBILEIRON^IPAD_AIR<br>... |
| a022123 | 63 | 63 | APP_IMAGE_CAPTURE^WEBSCANNER_VIEW<br>EI_PLATFORM_MOBILEIRON^IPAD_AIR<br>... |
| a239773 | 67 | 67 | APP_BPMIMAGING^PERSONAL_INVESTMENTS<br>APP_IMAGE_CAPTURE_SYSTEM^FULL_VIEW<br>... |
| ... | | | |

```
array([[[0. , 0.66666667, 0.83777858, ..., 1. , 1. , 1. ],
        [0.66666667, 0. , 0.89185239, ..., 1. , 1. , 0.52859548, ],
        [0.97412832, 0.89185239, 0. , ..., 1. , 1. , 1. ],
        [0.83777858, 0. , ..., 0. , 1. , 1. ],
        ...,
        [1. , 1. , 1. , ..., 0. , 1. , 1. ],
        [1. , 1. , 0.52859548, 1. , ..., 1. , 0. , 1. ],
        [1. , 0.97412832, 0.92445506, ..., 1. , 1. , 1. ],
        [0.92445506], 0. ,
        ]])
```

ENTERPRISE ACCESS CONTROL GOVERNANCE IN A COMPUTERIZED INFORMATION TECHNOLOGY (IT) ARCHITECTURE

TECHNICAL FIELD

This application relates generally to methods and apparatuses, including computer program products, for enterprise access control governance in a computerized information technology (IT) architecture.

BACKGROUND

A basic objective of information technology (IT) access control is to facilitate access to computing resources for authorized users and to deny access for unauthorized users. Enterprises of all sizes today face tremendous challenges in governing access control, including the difficulty for current IT access control systems and processes in scaling up and staying up-to-date with the most accurate access control parameters and profiles. In particular, maintaining the appropriate level of access to IT resources based on, e.g., job roles and related functions can become impractical due to the dynamic and global nature of today's workforce and the ever-shrinking lifecycle of IT resources. Entitlement to IT resources changes constantly and often loses its original or intended meaning.

The above challenges have some undesired consequences. First, governing access control inevitably involves processes that require heavy manual intervention to keep up with changes in both the user attributes and resource attributes. Secondly, as users move within the organization and change status or job functions, their access profiles do not typically change quickly enough to reflect their new status, resulting in weakened security control against unauthorized access. In the worst-case scenario, neither the users themselves nor the people who review and grant access understand what the entitlement actually means. As access to existing or new systems get added, currently, there is no optimal, efficient way to organize this new access into job roles.

SUMMARY

Therefore, methods and systems are needed to generate IT access control recommendations and implement IT access control policies in a scalable and automated manner. The techniques described herein advantageously leverage a computer-generated vector space that to both understand and visualize the range of existing access control entitlements attributed to individuals and/or job roles in a particular organization, as well as to automatically implement IT access control entitlement changes on a per-user and enterprise-wide scale. In particular, the visualization aspect of the present invention provides a clear and efficient view of the IT access control entitlements so that administrators can quickly identify users who may have access control entitlements that differ from peers in similar job roles, and so that administrators can determine whether any users specifically, or job roles more generally, have entitlements that pose a significant risk to the security of the enterprise IT systems. In addition, the methods and systems provide an automated system to remedy any potential discrepancies in order to maintain a fully secure IT system.

The techniques described herein provide several important advantages for the entire computerized lifecycle management for enterprise access control and governance. First, the vector space techniques of the present technology can be used alongside of any centralized access request and approval system by recommending and presenting to the end users the most relevant access entitlements. This helps to jump start access entitlement for new users, or newly-introduced job roles, as well as transferring users between roles. Because user attributes and job role attributes are typically well known within an enterprise, the systems and methods described herein avoid the shortcomings related to the so-called "cold start" issue common to existing systems that may not be capable of quickly onboarding a new user or new job role into the enterprise access control framework. The systems and methods described herein can also be used for automatically mining the vector space to identify job role and user access entitlements that are deemed low risks to improve overall efficiency via automated entitlement fulfillment and provisioning. Lastly, the techniques described herein can be used to improve the effectiveness of computerized access entitlement audit and reviews by either interactively visualizing of the mapped vector space or non-interactive processing in the background as batch-mode operations to modify user and job role entitlements to achieve conformity to security policies. The system provides for the ability to visually organize access into logical groups generated by machine learning algorithms into meaningful access job roles. The system also allows end-users to visually compare users with respect to how similar or dissimilar a given users entitlements are compared to others.

The invention, in one aspect, features a system for enterprise access control governance in a computerized information technology (IT) architecture. The system comprises a server computing device having a memory that stores computer-executable instructions and a processor that executes the computer-executable instructions. The server computing device determines a set of access control entitlements for each of a plurality of users of the computerized IT architecture. The server computing device converts each set of access control entitlements for each of the plurality of users into a multidimensional vector. The server computing device generates a vector space comprising a plurality of nodes, each node in the vector space corresponding to a multidimensional vector associated with the access control entitlements. The server computing device determines one or more clusters of nodes in the vector space by using a similarity measure to compare each node in the vector space to the other nodes, the similarity measure based upon one or more dimensions of the multidimensional vector. The server computing device identifies a job role associated with each of the one or more clusters of nodes in the vector space based upon one or more access control entitlements that are common to at least a portion of the nodes in each cluster. The server computing device locates one or more outlier nodes in the vector space, the one or more outlier nodes positioned at least a predetermined distance away from at least one of the one or more clusters in the vector space. The server computing device determines at least one difference between the set of access control entitlements for each of the one or more outlier nodes and the set of access control entitlements for at least one node in the nearest one or more clusters. The server computing device adjusts the set of existing access control entitlements for the each of the users associated with the one or more outlier nodes based upon the determined difference between the set of access control entitlements for each of the one or more outlier nodes and the set of access control entitlements for at least one node in the nearest one or more clusters.

The invention, in another aspect, features a computerized method of enterprise access control governance in a computerized information technology (IT) architecture. A server computing device determines a set of access control entitlements for each of a plurality of users of the computerized IT architecture. The server computing device converts each set of access control entitlements for each of the plurality of users into a multidimensional vector. The server computing device generates a vector space comprising a plurality of nodes, each node in the vector space corresponding to a multidimensional vector associated with the access control entitlements. The server computing device determines one or more clusters of nodes in the vector space by using a similarity measure to compare each node in the vector space to the other nodes, the similarity measure based upon one or more dimensions of the multidimensional vector. The server computing device identifies a job role associated with each of the one or more clusters of nodes in the vector space based upon one or more access control entitlements that are common to at least a portion of the nodes in each cluster. The server computing device locates one or more outlier nodes in the vector space, the one or more outlier nodes positioned at least a predetermined distance away from at least one of the one or more clusters in the vector space. The server computing device determines at least one difference between the set of access control entitlements for each of the one or more outlier nodes and the set of access control entitlements for at least one node in the nearest one or more clusters. The server computing device adjusts the set of existing access control entitlements for the each of the users associated with the one or more outlier nodes based upon the determined difference between the set of access control entitlements for each of the one or more outlier nodes and the set of access control entitlements for at least one node in the nearest one or more clusters.

Any of the above aspects can include one or more of the following features. In some embodiments, the difference comprises an entitlement in the set of access control entitlements for the one or more outlier nodes that is not included in the set of access control entitlements for at least one node in the nearest one or more clusters. In some embodiments, the difference comprises an entitlement in the set of access control entitlements for at least one node in the nearest one or more clusters that is not included in the set of access control entitlements for the one or more outlier nodes. In some embodiments, the difference comprises a difference between a value assigned to an entitlement in the set of access control entitlements for the one or more outlier nodes and a value assigned to an entitlement in the set of access control entitlements for at least one node in the nearest one or more clusters. In some embodiments, the server computing device identifies one or more access control security risks based upon the difference.

In some embodiments, the server computing device executes access control workflow instructions in an information technology access control system to adjust the set of access control entitlements for the one or more outlier nodes based upon the identified access control security risks. In some embodiments, the access control workflow instructions comprise one or more of: adding new entitlements to the set of access control entitlements for the one or more outlier nodes, changing one or more values of an entitlement in the set of access control entitlements for the one or more outlier nodes, or removing one or more entitlements from the set of access control entitlements for the one or more outlier nodes.

In some embodiments, the job role comprises one or more job role attributes, including: a job function, a title, a manager to which the job role is assigned, a business unit to which the job role is assigned, and an organization to which the job role is assigned. In some embodiments, each entitlement in the set of access control entitlements comprises one or more entitlement attributes, including: a name of the entitlement, a description of the entitlement, one or more privileged access flags, an application to which the entitlement is assigned, and a computing system to which the entitlement is assigned. In some embodiments, the similarity measure is a cosine similarity based upon a normalized dot product of (i) a dimension of the multidimensional vector for a first node and (ii) the corresponding dimension of the multidimensional vector for each other node. In some embodiments, the server computing device generates a one-dimensional distance matrix based upon the similarity measure and scales the one-dimensional distance matrix to a multidimensional distance matrix using a distance-preserving manifold learning method.

In some embodiments, the server computing device uses k-means clustering to identify the one or more clusters. In some embodiments, the server computing device generates a two-dimensional graphical representation of the vector space that depicts the one or more clusters and the one or more outlier nodes color-coded according to the identified job role.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
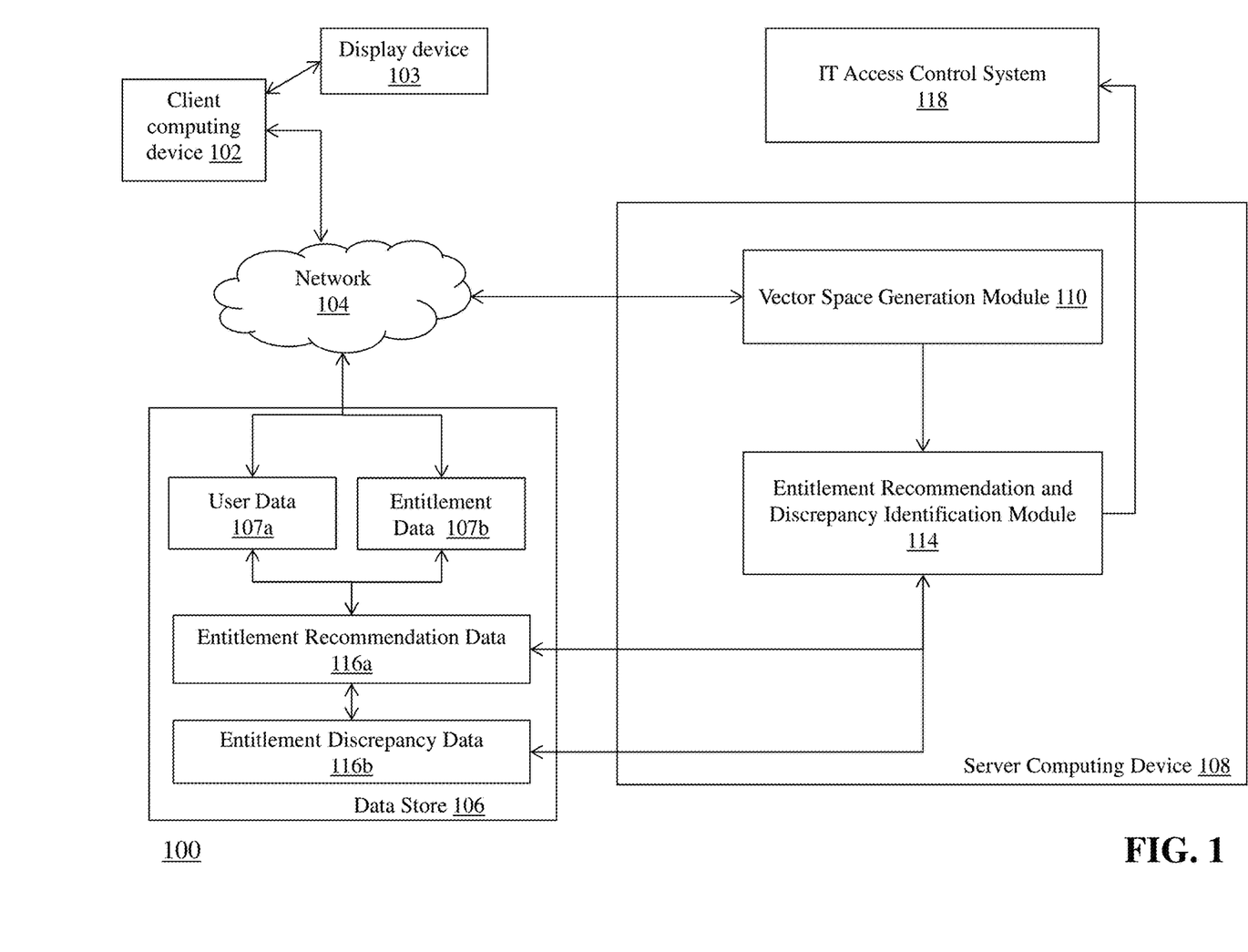
FIG. 1 is a block diagram of a system for enterprise access control governance in a computerized information technology (IT) architecture.

FIG. 1 is a block diagram of a system 100 for enterprise access control governance in a computerized information technology (IT) architecture. The system 100 includes a client computing device 102 that is coupled to a display device 103; a communications network 104; a data store 106 with user data 107a, entitlement data 107b, user entitlement recommendation data 116a, and entitlement discrepancy data 116b; a server computing device 108 having a processor that executes a vector space generation module 110, an entitlement matrix generation module 112 and an entitlement recommendation and discrepancy identification module 114; and an IT access control system 118 coupled to the server computing device 108.

The client computing device 102 connects to the communications network 104 in order to communicate with the server computing device 108 to provide input and receive output relating to the process of enterprise access control governance in a computerized information technology (IT) architecture as described herein. The client computing device 102 is coupled to a display device 103. For example, client computing device 102 can provide a detailed graphical user interface (GUI) via display device 103 that presents output resulting from the methods and systems described herein, where the GUI is utilized by an operator to review IT access control entitlements for a user, a group of users, a job role, and/or a plurality of job roles, and to make adjustments to corresponding IT infrastructure access control entitlements.

Exemplary client devices 102 include but are not limited to desktop computers, laptop computers, tablets, mobile devices, smartphones, smart watches, voice assistant devices, and internet appliances. It should be appreciated that other types of computing devices that are capable of connecting to the components of the system 100 can be used without departing from the scope of invention. Although FIG. 1 depicts a single client computing device 102, it should be appreciated that the system 100 can include any number of client computing devices. And as mentioned above, in some embodiments the client computing device 102 also includes a display 103 for receiving data from the server computing device 108 and/or the data store 106 and displaying the data to a user of the client computing device 102.

The communication network 104 enables the other components of the system 100 to communicate with each other in order to perform the process of enterprise access control governance in a computerized information technology (IT) architecture as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 108 is a combination of hardware, including one or more special-purpose processors and one or more physical memory modules, and specialized software engines that execute on the processor of the server computing device 108, to receive data from other components of the system 100, transmit data to other components of the system 100, and perform functions for enterprise access control governance in a computerized information technology (IT) architecture as described herein. As mentioned above, the processor of the server computing device 108 executes a vector space generation module 110, an entitlement matrix generation module 112, and an entitlement recommendation and discrepancy identification module 114. In some embodiments, the vector space generation module 110 includes programming that comprises, e.g., specific computer learning-based techniques (such as a multi-layered neural network) for use in carrying out the techniques described herein.

In some embodiments, the modules 110, 112, and 114 are specialized sets of computer software instructions programmed onto a dedicated processor in the server computing device 108 and can include specifically-designated memory locations and/or registers for executing the specialized computer software instructions. Further explanation of the specific processing performed by the modules 110, 112, and 114 will be provided below.

The data store 106 is a computing device (or in some embodiments, a set of computing devices) that is coupled to the server computing device 108 and is configured to receive, generate, and store specific segments of data relating to the process of enterprise access control governance in a computerized information technology (IT) architecture as described herein. In some embodiments, all or a portion of the data store 106 can be integrated with the server computing device 108 or be located on a separate computing device or devices. For example, the data store 106 can comprise one or more databases, such as MySQL™ available from Oracle Corp. of Redwood City, Calif. The data store 106 includes user data 107a, entitlement data 107b, user entitlement recommendation data 116a, and entitlement discrepancy data 116b.

The user data 107a is stored by the data store 106 via input from a web site/web page, from a computer file (e.g., XML, CSV, TXT), from an application programming interface (API) coupled to another computing system (e.g., a human resources system), from an application executing on the client device 102 and/or the server computing device 108, or other similar input methods. For example, a user at client computing device 102 can utilize a GUI provided by the client device 102 to select and/or input the user data 107a (e.g. directly and/or as a computer file) for transmission to the data store 106. The user data 107a includes one or more attributes of a user (e.g., an employee, consultant, etc.) of one or more computing resources in the IT architecture. For example, the attributes can include data elements such as a job role of the user, a job title of the user, a job function of the user, a manager of the user, an organization or business unit to which the user is assigned, and the like. As will be described below, some or all of these data elements can help define which computing resources in the IT architecture to which the user should or should not have access. In one example, each user has a user profile stored in the user data 107a and the user profile includes the attributes identified above and in some cases, other attributes such as demographic information, user identification information (e.g., ID number), and so forth.

The entitlement data 107b is stored by the data store 106 via input from a web site/web page, from a computer file (e.g., XML, CSV, TXT), from an application programming interface (API) coupled to another computing system (e.g., IT access control system 118), from an application executing on the client device 102 and/or the server computing device 108, or other similar input methods. For example, a user at client computing device 102 can utilize a GUI provided by the client device 102 to select and/or input the entitlement data 107b (e.g. directly and/or as a computer file) for transmission to the data store 106. The entitlement data 107b includes one or more attributes of an entitlement (e.g., ability to access) for one or more computing resources in the IT architecture. For example, the attributes can include data elements such as a name of the entitlement, a description of the entitlement, one or more flags that indicate if the entitlement maps to a privileged access, an application to which the entitlement relates, a computing system to which the entitlement relates, and the like. As will be described below, some or all of these data elements can help define which computing resources in the IT architecture are accessible by certain users of the IT architecture.

The user entitlement recommendation data 116a is generated via the processing of the engines 110, 112, 114 on the user data 107a and the entitlement data 107b, as will be described in greater detail below. In some embodiments, the user entitlement recommendation data 116a represents a set of entitlements to certain computing resources in the IT architecture for a particular user or a plurality of users (i.e., User A is entitled to access Computing Resource M, users in group X are entitled to access Computing Resource K, etc.) generated by the engines 110, 112, 114. The recommendation data 116a can be used to generate unique visualization graphs and similar representations of the data to a user at client device 102 via display device 103.

The entitlement discrepancy data 116b is generated via the processing of the engines 110, 112, 114 on the user data 107a and the entitlement data 107b, as will be described in greater detail below. In some embodiments, the entitlement discrepancy data 116b represents one or more differences between existing user entitlements to certain computing resources in the IT architecture and (i) recommended entitlements generated by the engines 110, 112, 114 and/or (ii) existing entitlements of clusters of users that are similar to a user in a certain aspect (e.g., User A has a similar or same job role as one or more other users that are assigned an entitlement to access Computing Resource L). In this way, the entitlement discrepancy data 116b is useful to identify potential and/or actual security risks to the IT architecture as a result of entitlements that are excessive in relation to similar users or existing entitlements. The entitlement discrepancy data 116b is also useful to identify combinations of users/job roles and entitlements that may violate, e.g., enterprise-wide access control policies, access privilege principles, and so forth. The entitlement discrepancy data 116b can be used to generate unique visualization graphs and similar representations of the data to a user at client device 102 via display device 103.

The server computing device 108 is coupled to an IT access control system 118, which manages the access request and review processes associated with the IT infrastructure for, e.g., an organization. The IT access control system 118 receives certain information, including user entitlement recommendation data 116a and entitlement discrepancy data 116b, from the server computing device 108 and integrates the data 116a, 116b with existing IT resource access procedures in order to generate actionable instructions and workflows to adjust existing access permissions and conduct detailed reviews of access permissions in order to mitigate and prevent potential security risks. For example, the IT access control system 118 can analyze the recommendation data 116a and the discrepancy data 116b to generate programmatic instructions (e.g., updates to database tables governing IT access permissions, approving and/or rejecting subsequent access requests received from remote computing devices, identifying and/or carrying out changes to user interface elements, automatically executing reviews of user profiles, and the like) for execution by the system 118 in order to implement the recommendations and remedy the discrepancies identified by the modules 110, 112, 114 of the server computing device 108 as described herein.

Figure 2:
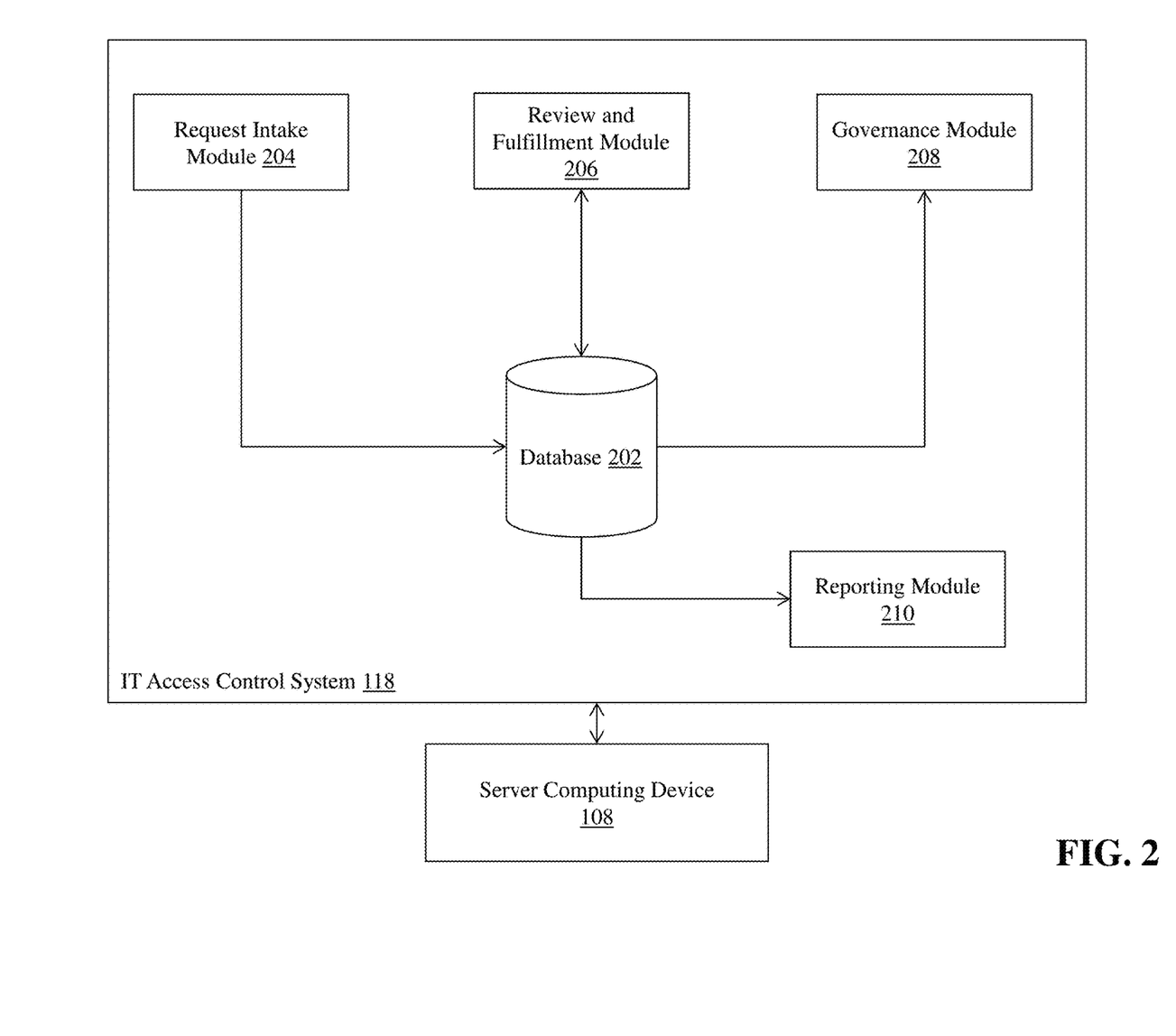
FIG. 2 is a detailed block diagram of an IT access control system.

FIG. 2 is a detailed block diagram of an embodiment of the IT access control system 118. As shown in FIG. 2, the IT access control system 118 includes a request/review database 202 that is coupled to several modules 204, 206, 208, 210 that each corresponds to a particular function of the IT access control system. In some embodiments, the modules 204, 206, 208, 210 are specialized sets of computer software instructions programmed onto a dedicated processor in a server computing device of the IT access control system 118, and can include specifically-designated memory locations and/or registers for executing the specialized computer software instructions For example, the request intake module 204 is configured to receive IT access requests (e.g., a user would like to gain access to a particular IT resource) from client computing devices. The IT access requests can include data elements that define the scope and parameters of the access request, including type of request, resource requested, justification for the request, and so forth. The request intake module 204 passes the incoming requests to the database 202.

The review and fulfillment module 206 retrieves the incoming access requests from database 202 and executes one or more access workflow processes to, e.g., determine whether the request should be approved (based upon the data elements of the request, and based upon the recommendation data 116a/discrepancy data 116b received from the server computing device 108) and to identify and provision specific IT assets and resources that are called out in the request. The review and fulfillment module 206 executes the workflow processes and updates necessary tables in database 202 to reflect the changed IT access permissions based upon evaluation of the access request.

The governance module 208 retrieves IT access control permissions and related data from database 202 to identify and manage, e.g., special permissions such as privileged access, access appropriate to role (AATR), and user access for individuals that may be outside the organization.

The IT access control system 118 also includes a reporting module 210 that extracts data from database 202 regarding IT access control permissions (e.g., for groups of users/ specific users) and generates reports for review by system administrators to determine the scope of existing access permissions, to identify potential discrepancies or security risks, and the like.

Figure 3:
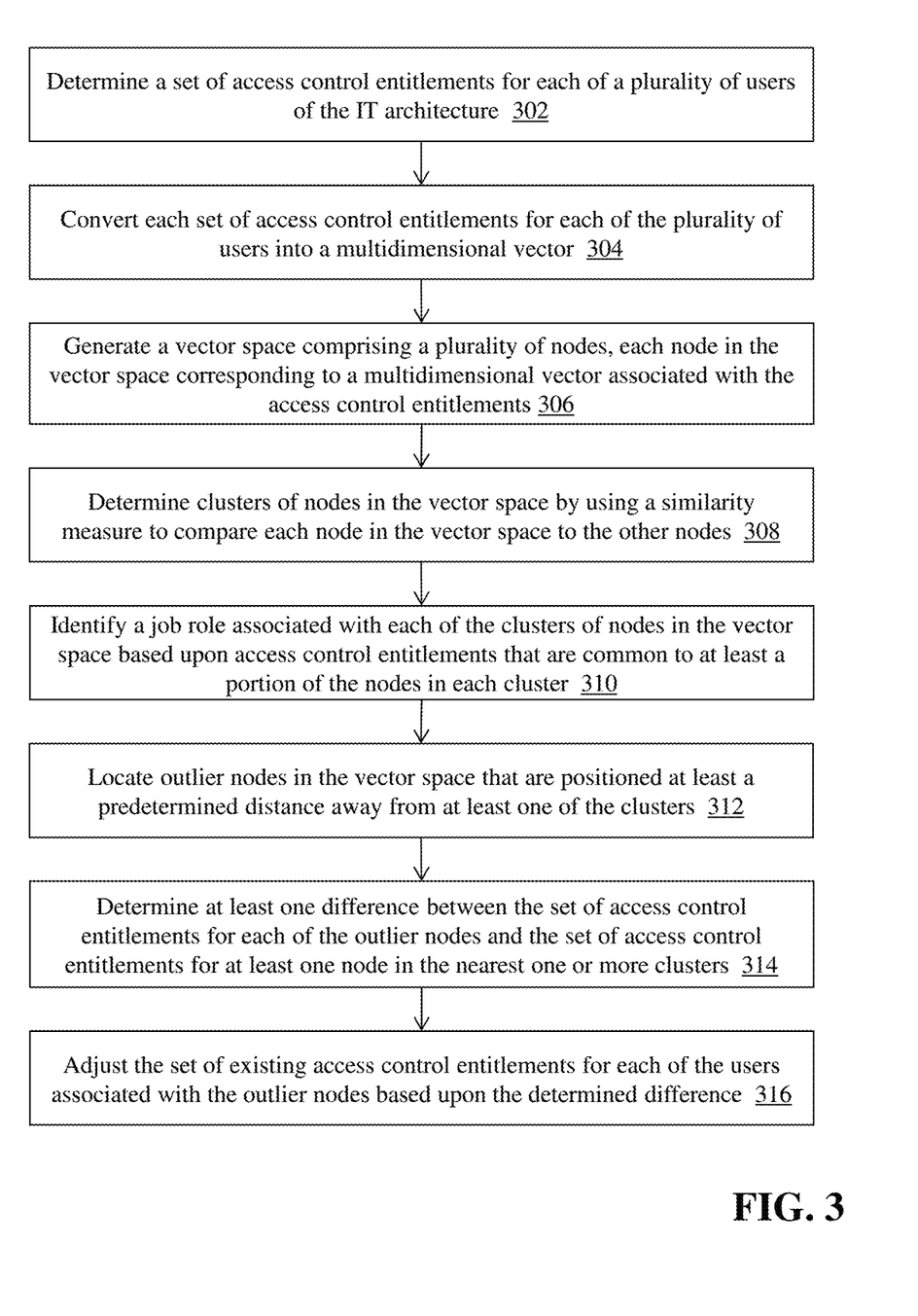
FIG. 3 is a flow diagram of a method of enterprise access control governance in a computerized information technology (IT) architecture.

FIG. 3 is a flow diagram of a method 300 of enterprise access control governance in a computerized information technology (IT) architecture, using the system 100 of FIG. 1. The vector space generation module 110 of server computing device 108 determines (302) a set of access control entitlements for each of a plurality of users of the IT architecture. For example, the vector space generation module 110 can retrieve user data 107a (e.g., user ID numbers or another type of user identifier) from data store 106. In one example, the user data 107 can comprise a delimited list (in JSON format) of user identifiers as follows:
{
"user_id":"a015978,a022123,a034899,a035037,a057694, a208638,a2254 87,a239773,a250968,a256693,a258705, a278140,a297069,a353133,a3690 88,a393569, . . .
}

In some embodiments, the delimited list of user identifiers is generated by the vector space generation module 110 based upon input provided by a user of client computing device 102—for example, a user of client computing device 102 can select certain criteria (e.g., business unit, division, group, job role, job title, etc.) for which he or she wants to analyze access control entitlements, and the vector space generation module 110 can retrieve the corresponding user identifiers from data store 106 to form the delimited list. In some embodiments, the vector space generation module 110 can validate one or more of the user identifiers selected or provided by a user of client computing device 102 and remove user identifiers that are not valid (e.g., the corresponding user is no longer an employee of the company, has changed job roles, etc.).

Figure 4:
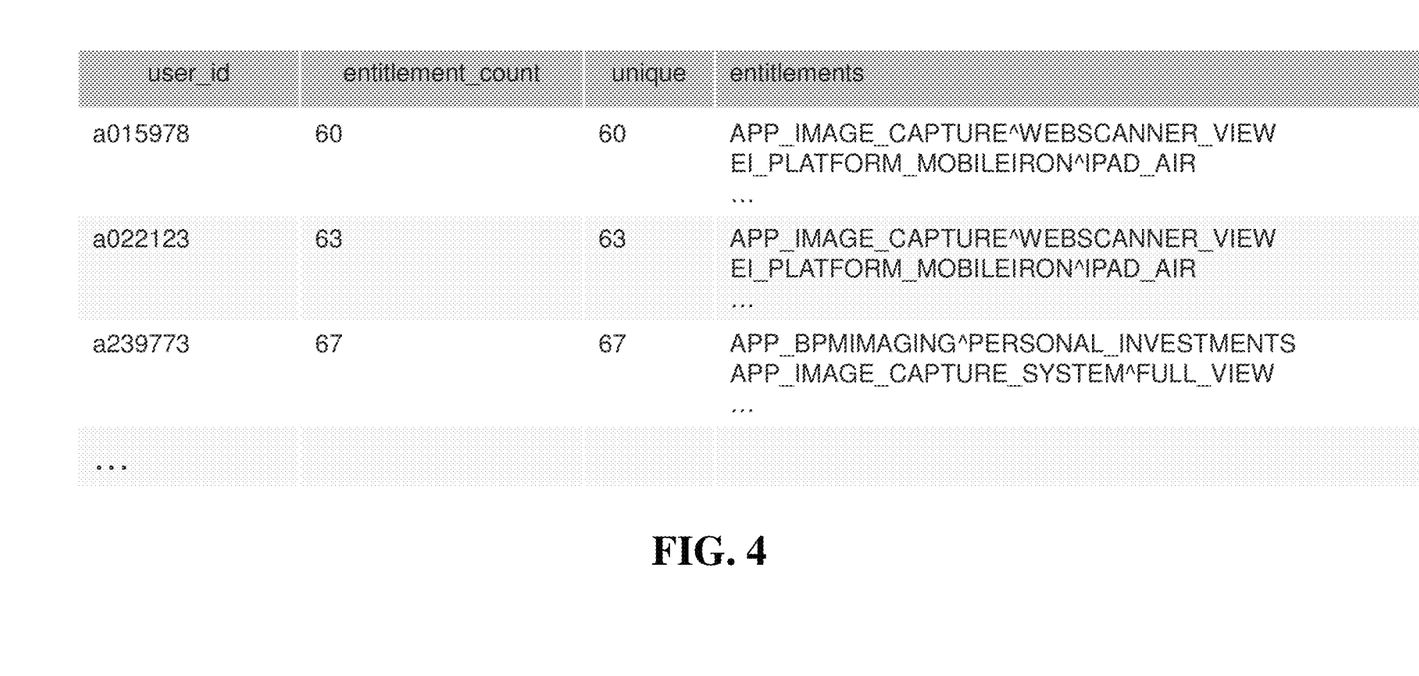
FIG. 4 is an exemplary data structure that shows access control entitlements corresponding to user identifiers.

The vector space generation module 110 can use the user identifier values in the delimited list to retrieve corresponding access control entitlements for each user from the entitlement data 107b in data store 106. FIG. 4 is an exemplary data structure that shows access control entitlements corresponding to user identifiers, as generated by the vector space generation module 110. As shown in FIG. 4, the data structure comprises a column with the user identifier ('user_id'), a column with the number of entitlements assigned to that user identifier ('entitlement_count'), a column with the number of unique entitlements assigned to that user identifier ('unique'), and a list of tokens corresponding to a set of entitlements for the user identifier ('entitlements').

The vector space generation module 110 converts (304) the tokens in the set of entitlements for each user identifier into a multidimensional vector. In some embodiments, the vector space generation module 110 uses a bag of words technique to vectorize the entitlement tokens into a form that can be used to insert the entitlements into the vector space. An exemplary bag of words technique is Scikit Learn's CountVectorizer module (available from scikit-learn.org) which counts the number of times a particular term or word appears in a message:

|  | Message 1 | Message 2 | ... | Message n |
|---|---|---|---|---|
| Word 1 Count | 0 | 1 | ... | 0 |
| Word 2 Count | 0 | 0 | ... | 0 |
| ... | ... | ... | ... | ... |
| Word n Count | 0 | 1 | ... | 1 |

Here, CountVectorizer can be used to count the number of times a particular entitlement appears in the set of entitlement tokens. An exemplary multidimensional vector generated by the vector space generation module 110 is [0, 1, 1, 1, 0, 0, 1, 0, 1, 1 ..., 1]. As described above, the vector space generation module 110 generates a multidimensional vector for each user (or user identifier) based upon the set of entitlements currently assigned to that user.

Then, the vector space generation module 110 generates (306) a multidimensional vector space comprising a plurality of nodes, where each node in the vector space corresponds to a multidimensional vector associated with a user's access control entitlements, as generated above. Each node in the vector space represents a user of one or more computing resources in the IT architecture, and each node includes the values from the multidimensional vector that relate to one or more access control entitlements of the user, based upon the entitlement data 107b as described previously. For example, the vector space generation module 110 can define a set of data structures (e.g., either stored locally and/or in data store 106) where each data structure comprises data elements corresponding to the attributes for a particular node in the vector space. In some embodiments, the nodes can include one or more attributes of the particular user (e.g., job role, job title, etc.) as retrieved from the user data 107a.

Once the vector space generation module 110 inserts all of the multidimensional vectors within the multidimensional vector space, the module 110 determines (308) clusters of nodes in the vector space by using a similarity measure to compare each node in the vector space to the other nodes based upon the access control entitlement data associated with the nodes. In one embodiment, the similarity measure used by the module 110 is cosine similarity.

Generally, a cosine similarity metric finds the normalized dot product of two different vectors in the vector space. By determining the cosine similarity, the system effectively tries to find the cosine of the angle between the two vectors. For example, the cosine of 0° is 1, and the cosine is less than 1 for any other angle. Thus, cosine similarity is a judgment of orientation and not magnitude: two vectors with the same orientation have a cosine similarity of 1, two vectors at 90° have a similarity of 0, and two vectors diametrically opposed have a similarity of −1, independent of their magnitude. Cosine similarity is particularly used in positive vector spaces, where the outcome is neatly bounded in [0,1]. One of the reasons for the popularity of cosine similarity is that it is very efficient to evaluate, especially for sparse vectors.

Figure 5:
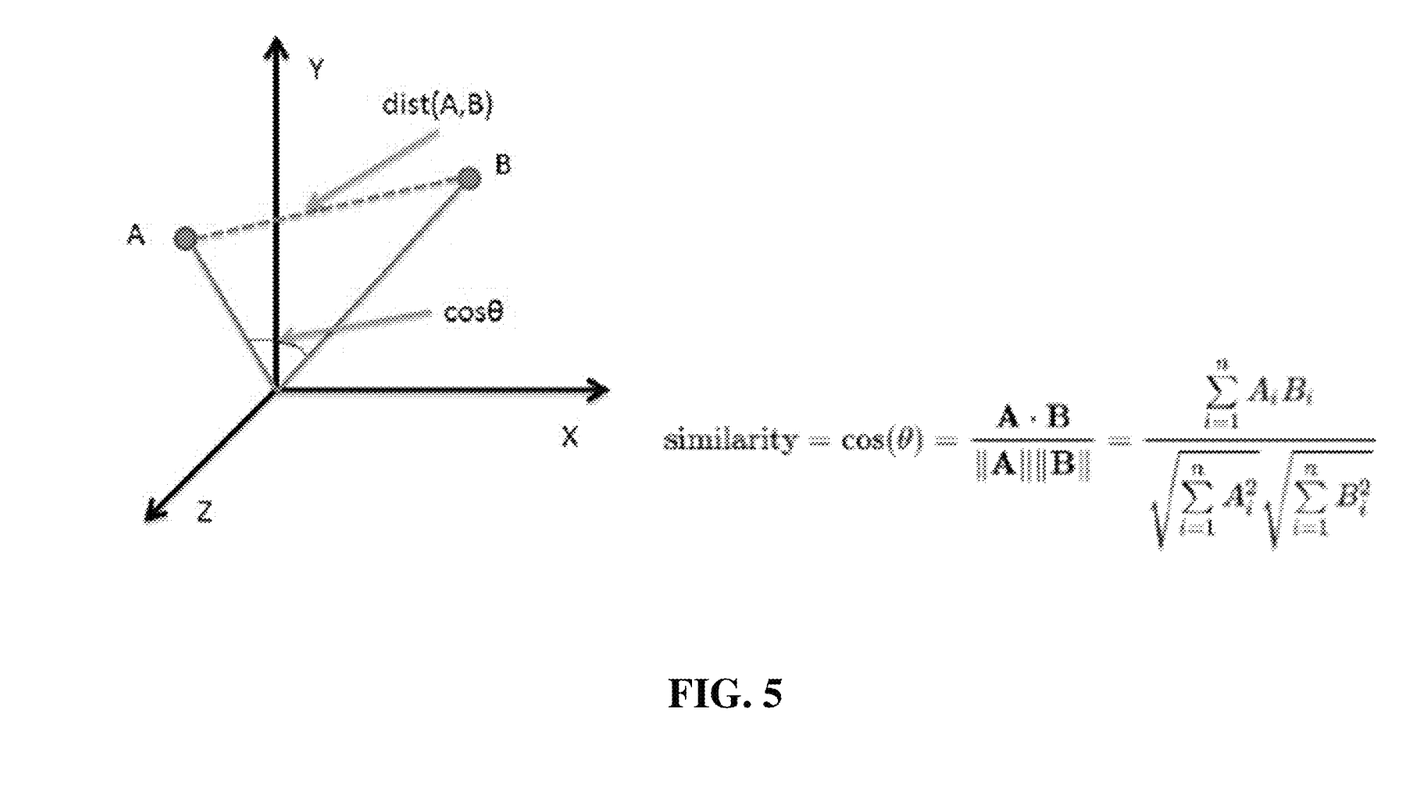
FIG. 5 is a diagram of an exemplary cosine similarity technique used by the vector space generation module.

FIG. 5 is a diagram of an exemplary cosine similarity technique used by the vector space generation module 110. As shown in FIG. 5, dot A is a first node in the vector space and dot B is a second node in the vector space. The module 110 determines the cosine of the angle formed by the vectors [cos(θ)] which can then be used to determine the distance between the two nodes [dist(A,B)]. An exemplary algorithm for determining cosine similarity is provided in FIG. 5. In some embodiments, the vector space generation module 110 uses Scikit Learn's pairwise metric cosinesimilarity module (i.e., sklearn.metrics.pairwise.cosine_similarity) to determine the cosine similarity value. As the module 110 needs distance measure and similarity, the module 110 subtracts the above result by 1 which gives the cosine distance between two vectors.

In some embodiments, the cosine distance is used for two purposes: (1) to visualize the input user identifiers and entitlements in a two-dimensional (2D) plot; and (2) to be used as a distance measure in k-means clustering.

Figure 6:
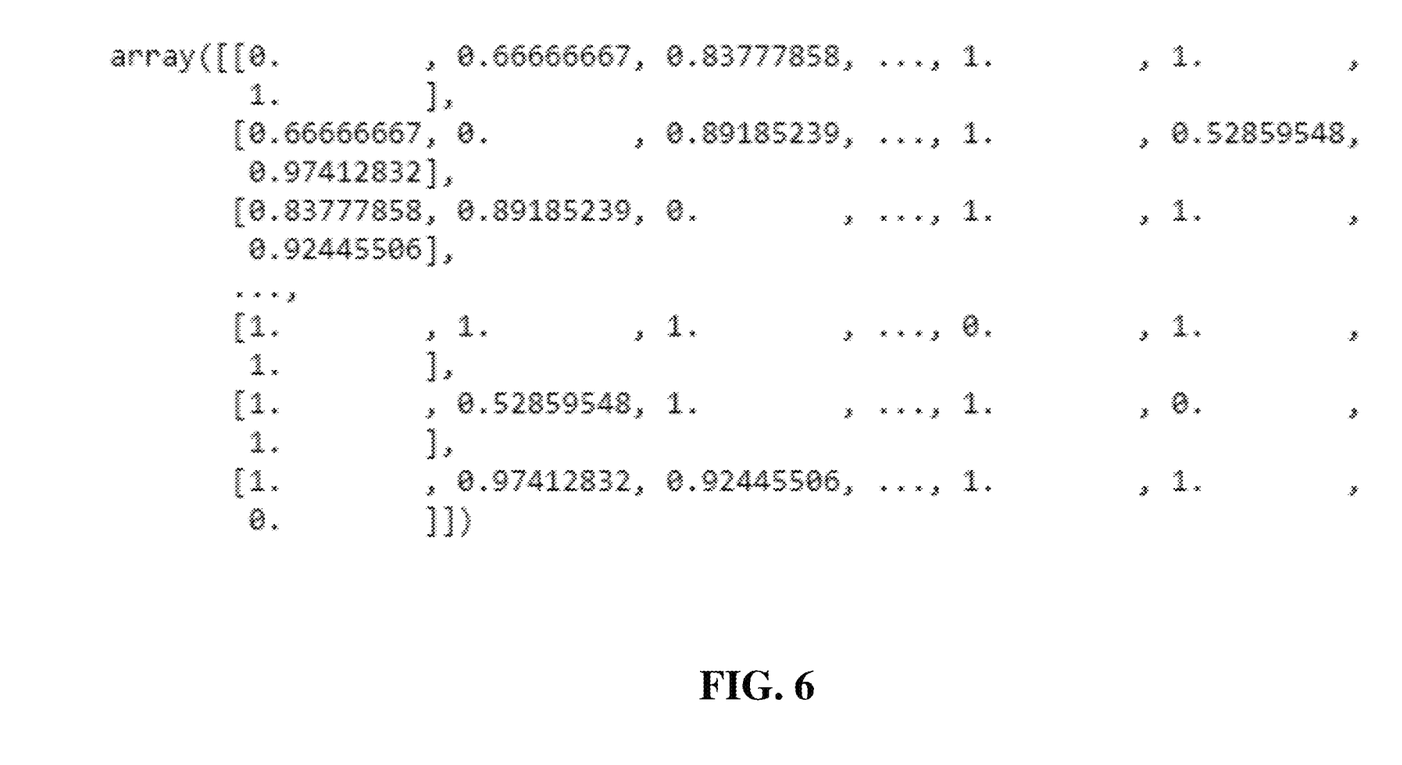
FIG. 6 is an exemplary distance matrix generated by the vector space generation module.

For visualization purposes, the vector space generation module 110 can convert the sparse matrix obtained from the CountVectorizer module to a numpy matrix (e.g., numpy.matrix( ) function in Python). Then, the module 110 can calculate the cosine distance measure for the numpy matrix. An exemplary distance matrix generated by the vector space generation module 110 is shown in FIG. 6.

It should be appreciated that the distance matrix generated by the vector space generation module 110 is a one-dimensional matrix. In order to visualize the same in a 2D plane, the module 110 can project the distance matrix to 2D. In one example, the module 110 can use a manifold learning method called Multi-Dimensional Scaling (MDS) to perform the projection of the distance matrix.

MDS is a distance-preserving manifold learning method. All manifold learning algorithms assume the dataset lies on a smooth, non-linear manifold of low dimension and that a mapping f: RD→Rd (D>>d) can be found by preserving one or more properties of the higher dimension space. Distance-preserving methods assume that a manifold can be defined by the pairwise distances of its points. In distance-preserving methods, a low dimensional embedding is obtained from the higher dimension in such a way that pairwise distances between the points remain the same. Some distance preserving methods preserve spatial distances (MDS) while some preserve graph distances.

In one example, after applying MDS to the cosine distance matrix described herein, the module 110 generates the following data:

| Element | x | y |
|---|---|---|
| 0 | 0.49955 | −0.680708 |
| 1 | −0.058368 | −0.656317 |
| 2 | −0.392994 | −0.211843 |
| 3 | −0.131581 | −0.315058 |
| 4 | 0.728327 | −0.043709 |
| 5 | 0.539676 | 0.342055 |
| 6 | −0.698806 | −0.188583 |
| 7 | −0.629279 | 0.263230 |
| 8 | −0.466349 | 0.547672 |
| 9 | 0.293869 | 0.597631 |
| ... | ... | ... | where x, y represent the coordinates of each element of the distance matrix.

Figure 7:
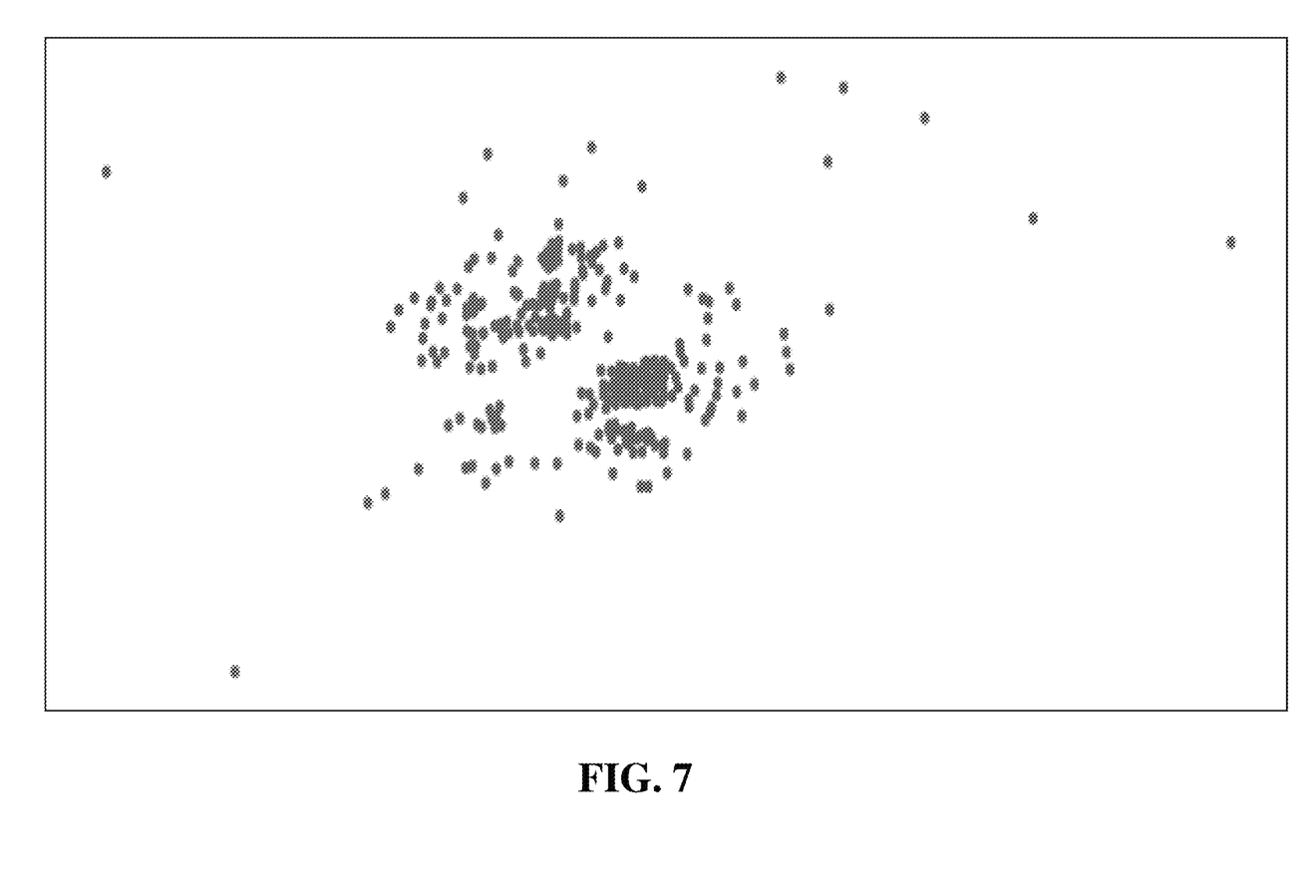
FIG. 7 is an exemplary 2D visualization of the cosine distance matrix data generated by the vector space generation module.

To visualize the coordinates in a 2D plot, the vector space generation module 110 can utilize the plotly visualization library (available from plot.ly/python/) to generate, e.g., a scatter plot. FIG. 7 is an exemplary 2D visualization of the cosine distance matrix data generated by the vector space generation module 110. As shown in FIG. 7, a majority of the elements are located near the center of the plot with a few elements distributed around the edges of the plot.

As mentioned above, to determine (308) the clusters of nodes in the vector space, the vector space generation module 110 can use a k-means clustering technique. Generally, a k-means algorithm searches for a pre-determined number of clusters within an unlabeled multidimensional dataset. The algorithm accomplishes this using a simple conception of what the optimal clustering looks like:

- The "cluster center" is the arithmetic mean of all the points belonging to the cluster.
- Each point is closer to its own cluster center than to other cluster centers.

Two popular ways of determining clusters are (i) elbow method; and (ii) silhouette analysis. The elbow method is a method of interpretation and validation of consistency within cluster analysis designed to help finding the appropriate number of clusters in a dataset. This method looks at the percentage of variance explained as a function of the number of clusters: One should choose a number of clusters so that adding another cluster doesn't give much better modeling of the data. For silhouette analysis, the silhouette plot displays a measure of how close each point in one cluster is to points in the neighboring clusters and thus provides a way to assess parameters like number of clusters visually. This measure has a range of [−1, 1]. Silhouette coefficients (as these values are referred to) near +1 indicate that the sample is far away from the neighboring clusters. A value of 0 indicates that the sample is on or very close to the decision boundary between two neighboring clusters and negative values indicate that those samples might have been assigned to the wrong cluster.

However, in some instances, k-means clustering does have limitations. The fundamental model assumptions of k-means (i.e., points will be closer to their own cluster center than to others) means that the k-means clustering algorithm can be ineffective if the clusters have complicated geometries. In particular, the boundaries between k-means clusters will always be linear, which means that it will fail for more complicated boundaries. In some embodiments, the vector space generation module 110 can use the KMeansClusterer module from the NLTK (nitk.org) library which supports cosine-distance.

In some embodiments, the module 110 starts the K-means clusterer with k arbitrary chosen means, then allocates each vector to the cluster with the closest mean. The module 110 then recalculates the means of each cluster as the centroid of the vectors in the cluster. This process repeats until the cluster memberships stabilize. This is a hill-climbing algorithm which may converge to a local maximum. Hence, the clustering is often repeated with random initial means and the most commonly occurring output means are chosen.

Figure 8:
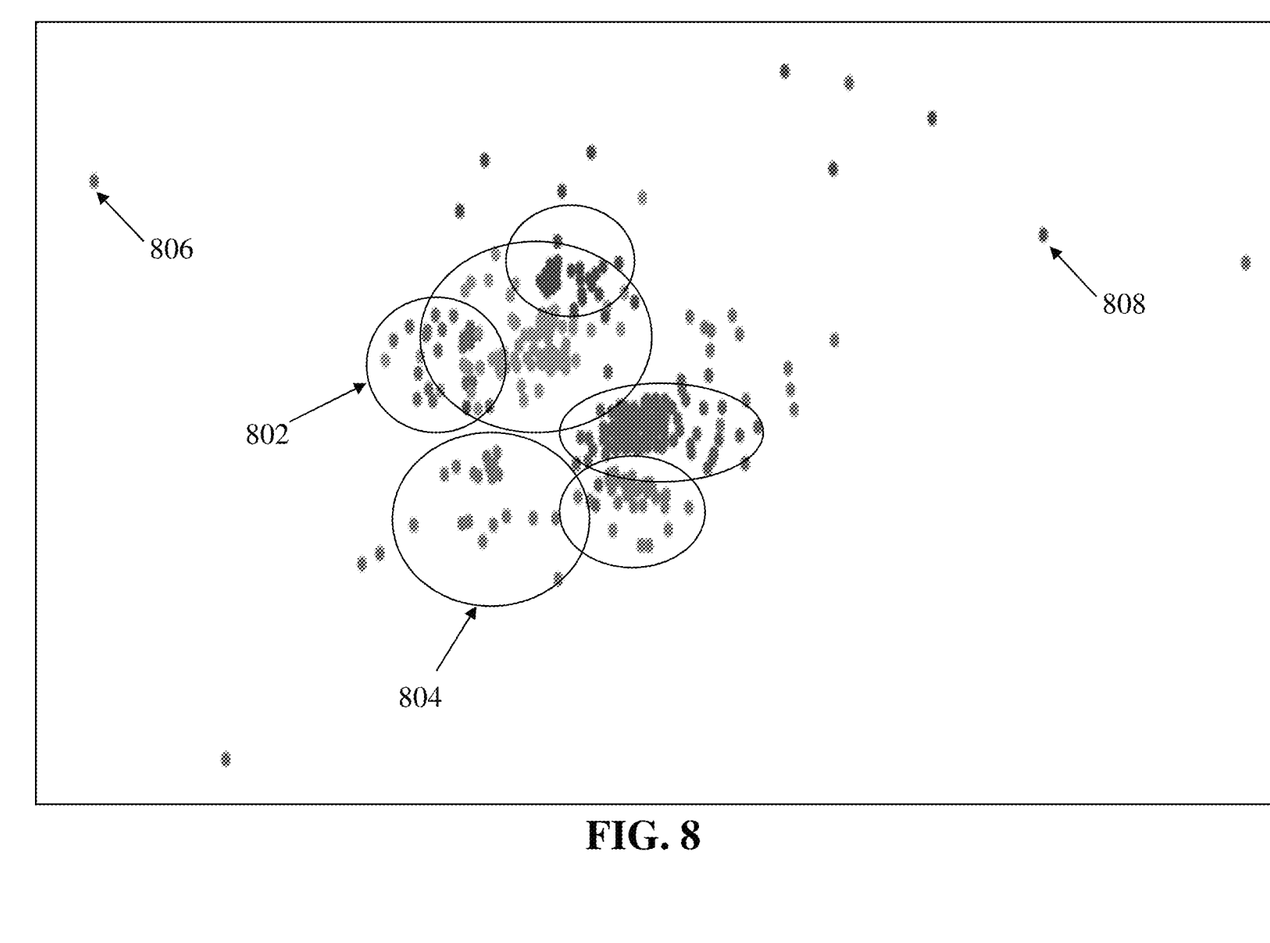
FIG. 8 is an exemplary 2D visualization of the cosine distance matrix data generated by the vector space generation module after clustering has been performed.

FIG. 8 is an exemplary 2D visualization of the cosine distance matrix data generated by the vector space generation module 110 after clustering has been performed by the module. As shown in FIG. 8, the circled areas (e.g., 802, 804) generally represent different clusters of nodes in the vector space that share similarities between access control entitlements—i.e., indicating users potentially having the same job role. In some embodiments, the clusters and/or nodes within each cluster are color-coded to visually distinguish the clusters and nodes from the other clusters.

It should be appreciated that some of the nodes are outliers from the defined clusters (e.g., nodes 806, 808)—however, the module 110 can still determine a job role for these nodes based upon a level of similarity between the vector for that user and the vectors for one or more of the clusters of nodes. It should further be appreciated that some of the nodes may fall within more than one cluster—indicating that the users have access control entitlement similarities between multiple potential job roles. The vector space generation module 110 can generate a visual representation of the clustered 2D plot for display to a user of client computing device 102.

The vector space generation module 110 can also transmit the clustered 2D plot and related matrix data to the entitlement recommendation and discrepancy module 114 to perform certain functions as described below. The entitlement recommendation and discrepancy identification module 114 receives the clustered 2D plot and related cosine distance matrix data from the vector space generation module 110 and identifies (310) a job role associated with each of the clusters of nodes in the vector space based upon access control entitlements that are common to at least a portion of the nodes in each cluster. For example, the entitlement recommendation and discrepancy identification module 114 can determine that an IT admin job role is assigned to cluster 802 of FIG. 8 because several of the access control entitlements that are common to the nodes in that cluster relate to specific functions that are part of the IT admin responsibilities. In some embodiments, the entitlement recommendation and discrepancy identification module 114 can retrieve one or more job roles assigned to specific entitlements in the cluster from the entitlement data 107b and determine a most frequent job role that appears—indicating which job role is most likely assigned to users in that cluster. In some embodiments, the entitlement recommendation and discrepancy identification module 114 can determine a list of job titles or other attributes of the users within the cluster and characterize the users into a predefined job role based upon those attributes.

The entitlement recommendation and discrepancy identification module 114 also locates (312) one or more outlier nodes in the vector space (such as outliers 806, 808 from FIG. 8) that are positioned at least a predetermined distance away from at least one of the clusters. As shown in FIG. 8, outlier 806 may have one or more entitlements that are common with the entitlements of nodes in cluster 802—but overall, the outlier 806 has one or more entitlements that are different from those in cluster 802 such that outlier 806 is far away from the cluster in cosine distance. The entitlement recommendation and discrepancy identification module 114 locates these outliers in order to determine differences between the outliers and the clusters, and to potentially remediate existing access control entitlements for either (i) the user represented by the outlier and/or (ii) the users within the cluster to which the outlier likely belongs.

The entitlement recommendation and discrepancy identification module 114 determines (314) at least one difference between the set of access control entitlements for each of the outlier nodes and the set of access control entitlements for at least one node in the nearest one or more clusters.

For example, the module 114 can identify that a particular user assigned to a certain job role (i.e., outlier 806) has been assigned an entitlement to access an IT resource that no other users assigned to the same job role (i.e., users in cluster 802) have. As such, the difference in entitlements can be determined as a discrepancy, and assigned a value to indicate, e.g., how much of an outlier the user is from the other group members and/or the entitlement is from the recommended set of entitlements for the user's group or the existing set of entitlements for others in the user's group.

In this way, the module 114 can compute a similarity score (e.g., using the cosine similarity as a basis for comparison) for each user based upon a comparison of the outlier's existing access control entitlements to the set of access control entitlements for the corresponding cluster, and use the score to detect users whose entitlements deviate from expected or recommended entitlements, users who have toxic combinations of access that violate organizational requirements or policies, and so forth.

Once the entitlement recommendation and discrepancy identification module 114 has determined one or more discrepancies between, e.g., the access control entitlements for an outlier node and the set of access control entitlements for the nodes in one or more of the nearest clusters, the module 114 adjusts (316) the set of existing access control entitlements for the user represented by the outlier based upon the discrepancy. For example, the module 114 generates programmatic workflow instructions for adjusting the existing access control requirements (e.g., messages, code, API commands, and so forth) that are transmitted to the IT access control system 118 for execution. The workflow instructions can comprise the addition of new access control entitlements to the set of access control entitlements for one or more outlier nodes (e.g., granting permission to access a particular function or IT resource in the architecture), changing one or more values of an entitlement in the set of access control entitlements for the one or more outlier nodes (e.g., converting a read/write permission on a database table to only a read permission), or removing one or more entitlements from the set of access control entitlements for the one or more outlier nodes (e.g., preventing the user from accessing a particular computing resource or application function altogether).

In one embodiment, the programmatic instructions comprise a workflow for updating data records and revising permissions in the IT access control system 118 to effect changes that resolve the identified discrepancy. The IT access control system 118 receives the instructions from the module 114 and executes the instructions to alter the access control entitlements for the user (e.g., updating a user profile in database 202). In some embodiments, the module 114 also instructs the entitlement matrix generation module 112 to update the entitlement utility matrix with the changed access control entitlement data resulting from execution of the instructions.

In one embodiment, an exemplary use case is a transferring user. In this case, the system generates a set of entitlements to be used as a current point-in-time baseline access entitlements most relevant for this user, compares the baseline entitlements with the existing entitlements of the user, and sends over a list to, e.g., an information technology provisioning system for automatic provision of any new entitlements as well as a list for removing any existing entitlements not required for the job role to which this user is transferring.

An important and advantageous aspect of the methods and systems described herein is the dynamic approach to visualization of user access control entitlements that the system 100 employs. Using the techniques of generating a multidimensional cosine distance matrix and 2D plot to determine patterns of entitlement access as well as deviations from existing access control entitlements as described above, the system 100 can generate visual representations of the data to provide a robust and innovative user interface for understanding specific aspects of the user-entitlement relationships in an organization—as well as quickly identifying areas that are in need of deeper analysis and remediation to avoid potentially harmful security risks.

Method steps can be performed by one or more special-purpose processors executing a computer program to perform functions of the invention by operating on input data and/or generating output data. Method steps can also be performed by, and an apparatus can be implemented as, special-purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special-purpose microprocessors. Generally, a processor receives instructions and data from a read-only memory or a random access memory or both. The essential elements of a computer are a specialized processor for executing instructions and one or more specifically-allocated memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for enterprise access control governance in a computerized information technology (IT) architecture, the system comprising a server computing device having a memory that stores computer-executable instructions and a processor that executes the computer-executable instructions to:
   determine a set of access control entitlements for each of a plurality of users of the computerized IT architecture, the set of access control entitlements for each user including a user id, an entitlement count, a number of unique entitlements for the user identifier, and a plurality of tokens corresponding to access control entitlements;
   convert, for each of the plurality of users, the plurality of tokens in the set of access control entitlements for the user into a multidimensional vector using a bag of words technique;
   generate a vector space comprising a plurality of nodes, each node in the vector space corresponding to a multidimensional vector associated with the access control entitlements for a user of the plurality of users;
   determine one or more clusters of nodes in the vector space by using a similarity measure to compare each node in the vector space to the other nodes, the similarity measure based upon one or more dimensions of the multidimensional vectors;
   generate a one-dimensional (1D) distance matrix using the similarity measures;
   identify a job role associated with each of the one or more clusters of nodes in the vector space based upon one or more access control entitlements that are common to at least a portion of the nodes in each cluster;
   locate one or more outlier nodes in the vector space, the one or more outlier nodes positioned at least a predetermined distance away from at least one of the one or more clusters in the vector space;
   determine at least one difference between the set of access control entitlements for each of the one or more outlier nodes and the set of access control entitlements for at least one node in the nearest one or more clusters;
   adjust the set of existing access control entitlements for the each of the users associated with the one or more outlier nodes based upon the determined difference between the set of access control entitlements for each of the one or more outlier nodes and the set of access control entitlements for at least one node in the nearest one or more clusters;
   project the 1D distance matrix to a two-dimensional (2D) distance matrix using a distance-preserving manifold learning algorithm; and generate a 2D visualization of the 2D distance matrix for display on a client computing device.

2. The system of claim 1, wherein the difference comprises an entitlement in the set of access control entitlements for the one or more outlier nodes that is not included in the set of access control entitlements for at least one node in the nearest one or more clusters.

3. The system of claim 1, wherein the difference comprises an entitlement in the set of access control entitlements for at least one node in the nearest one or more clusters that is not included in the set of access control entitlements for the one or more outlier nodes.

4. The system of claim 1, wherein the difference comprises a difference between a value assigned to an entitlement in the set of access control entitlements for the one or more outlier nodes and a value assigned to an entitlement in the set of access control entitlements for at least one node in the nearest one or more clusters.

5. The system of claim 1, wherein the server computing device identifies one or more access control security risks based upon the difference.

6. The system of claim 5, wherein the server computing device executes access control workflow instructions in an information technology access control system to adjust the set of access control entitlements for the one or more outlier nodes based upon the identified access control security risks.

7. The system of claim 6, wherein the access control workflow instructions comprise one or more of: adding new entitlements to the set of access control entitlements for the one or more outlier nodes, changing one or more values of an entitlement in the set of access control entitlements for the one or more outlier nodes, or removing one or more entitlements from the set of access control entitlements for the one or more outlier nodes.

8. The system of claim 1, wherein the job role comprises one or more job role attributes, including: a job function, a title, a manager to which the job role is assigned, a business unit to which the job role is assigned, and an organization to which the job role is assigned.

9. The system of claim 1, wherein each entitlement in the set of access control entitlements comprises one or more entitlement attributes, including: a name of the entitlement, a description of the entitlement, one or more privileged access flags, an application to which the entitlement is assigned, and a computing system to which the entitlement is assigned.

10. The system of claim 1, wherein the similarity measure is a cosine similarity based upon a normalized dot product of (i) a dimension of the multidimensional vector for a first node and (ii) the corresponding dimension of the multidimensional vector for each other node.

11. The system of claim 1, wherein the server computing device uses k-means clustering to identify the one or more clusters.

12. The system of claim 1, wherein the 2D visualization of the 2D distance matrix depicts the one or more clusters and the one or more outlier nodes color-coded according to the identified job role.

13. A computerized method of enterprise access control governance in a computerized information technology (IT) architecture, the method comprising:

determining, by a server computing device, a set of access control entitlements for each of a plurality of users of the computerized IT architecture, the set of access control entitlements for each user including a user identifier, an entitlement count, a number of unique entitlements for the user id, and a plurality of tokens corresponding to access control entitlements;

converting, by the server computing device for each of the plurality of users, the plurality of tokens in the set of access control entitlements for the user into a multidimensional vector using a bag of words technique;

generating, by the server computing device, a vector space comprising a plurality of nodes, each node in the vector space corresponding to a multidimensional vector associated with the access control entitlements for a user of the plurality of users;

determining, by the server computing device, one or more clusters of nodes in the vector space by using a similarity measure to compare each node in the vector space to the other nodes, the similarity measure based upon one or more dimensions of the multidimensional vectors;

generate a one-dimensional (1D) distance matrix using the similarity measures;

identifying, by the server computing device, a job role associated with each of the one or more clusters of nodes in the vector space based upon one or more access control entitlements that are common to at least a portion of the nodes in each cluster;

locating, by the server computing device, one or more outlier nodes in the vector space, the one or more outlier nodes positioned at least a predetermined distance away from at least one of the one or more clusters in the vector space;

determining, by the server computing device, at least one difference between the set of access control entitlements for each of the one or more outlier nodes and the set of access control entitlements for at least one node in the nearest one or more clusters;

adjusting, by the server computing device, the set of existing access control entitlements for the each of the users associated with the one or more outlier nodes based upon the determined difference between the set of access control entitlements for each of the one or more outlier nodes and the set of access control entitlements for at least one node in the nearest one or more clusters;

projecting, by the server computing device, the 1D distance matrix to a two-dimensional (2D) distance matrix using a distance-preserving manifold learning algorithm; and generating, by the server computing device, a 2D visualization of the 2D distance matrix for display on a client computing device.

14. The method of claim 13, wherein the difference comprises an entitlement in the set of access control entitlements for the one or more outlier nodes that is not included in the set of access control entitlements for at least one node in the nearest one or more clusters.

15. The method of claim 13, wherein the difference comprises an entitlement in the set of access control entitlements for at least one node in the nearest one or more clusters that is not included in the set of access control entitlements for the one or more outlier nodes.

16. The method of claim 13, wherein the difference comprises a difference between a value assigned to an entitlement in the set of access control entitlements for the one or more outlier nodes and a value assigned to an entitlement in the set of access control entitlements for at least one node in the nearest one or more clusters.

17. The method of claim 13, wherein the server computing device identifies one or more access control security risks based upon the difference.

18. The method of claim 17, wherein the server computing device executes access control workflow instructions in an information technology access control system to adjust the set of access control entitlements for the one or more outlier nodes based upon the identified access control security risks.

19. The method of claim 18, wherein the access control workflow instructions comprise one or more of: adding new entitlements to the set of access control entitlements for the one or more outlier nodes, changing one or more values of an entitlement in the set of access control entitlements for the one or more outlier nodes, or removing one or more entitlements from the set of access control entitlements for the one or more outlier nodes.

20. The method of claim 13, wherein the job role comprises one or more job role attributes, including: a job function, a title, a manager to which the job role is assigned, a business unit to which the job role is assigned, and an organization to which the job role is assigned.

21. The method of claim 13, wherein each entitlement in the set of access control entitlements comprises one or more entitlement attributes, including: a name of the entitlement, a description of the entitlement, one or more privileged access flags, an application to which the entitlement is assigned, and a computing system to which the entitlement is assigned.

22. The method of claim 13, wherein the similarity measure is a cosine similarity based upon a normalized dot product of (i) a dimension of the multidimensional vector for a first node and (ii) the corresponding dimension of the multidimensional vector for each other node.

23. The method of claim 13, wherein the server computing device uses k-means clustering to identify the one or more clusters.

24. The method of claim 13, wherein the 2D visualization of the 2D distance matrix depicts the one or more clusters and the one or more outlier nodes color-coded according to the identified job role.

* * * * *